(12) United States Patent
Nooner et al.

(10) Patent No.: US 7,904,555 B2
(45) Date of Patent: *Mar. 8, 2011

(54) SYSTEMS AND METHODS FOR FLOW SIGNATURE FORMATION AND USE

(75) Inventors: Ricky L. Nooner, Broomfield, CO (US); Gerald H. Gorsegner, Jr., Denver, CO (US); Danny R. Rock, Superior, CO (US); Patrick S. Callahan, Thornton, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/829,859

(22) Filed: Jul. 2, 2010

(65) Prior Publication Data
US 2010/0274896 A1 Oct. 28, 2010

Related U.S. Application Data

(63) Continuation of application No. 11/463,835, filed on Aug. 10, 2006, now Pat. No. 7,752,297.

(60) Provisional application No. 60/707,657, filed on Aug. 11, 2005.

(51) Int. Cl.
*G06F 15/173* (2006.01)
(52) U.S. Cl. ...... 709/224; 709/223; 709/203; 379/210.1; 705/40; 705/69

(58) Field of Classification Search .......... 709/223, 709/203; 379/210.1; 705/40, 69
See application file for complete search history.

(56) References Cited

U.S. PATENT DOCUMENTS

| 6,240,401 | B1 * | 5/2001 | Oren et al. .............. 705/40 |
| 6,553,351 | B1 * | 4/2003 | De Jong et al. .......... 705/69 |
| 2005/0063527 | A1 * | 3/2005 | Bury et al. .............. 379/210.01 |
| 2006/0149811 | A1 * | 7/2006 | Bennett et al. ........... 709/203 |

* cited by examiner

*Primary Examiner* — Tammy T Nguyen
(74) *Attorney, Agent, or Firm* — John C. Heuton (57) ABSTRACT

An embodiment of a method for use in performing interoperability testing between two network architectures includes forming multiple transaction signatures that each characterizes a communication transaction conducted over the two networks and analyzing each of the transaction signatures to determine if the transaction signature matches a previously classified pattern. The method may further include generating a report identifying each of the communication transactions and indicating that each of the communication transactions is classified with a classification associated with a previously classified pattern or are of unknown classification. Another method includes receiving a transaction signature composed of multiple transaction elements, and determining whether the received transaction signature corresponds to a previously identified transaction signature pattern. If the transaction signature does not correspond to a previously identified transaction signature pattern, a new transaction signature pattern is created, and classified as one of a plurality of classifications indicative of completion or failure of the communication transaction.

13 Claims, 8 Drawing Sheets

SYSTEMS AND METHODS FOR FLOW SIGNATURE FORMATION AND USE

RELATED APPLICATIONS

This application is a continuation of U.S. patent application Ser. No. 11/463,835, now U.S. Pat. No. 7,752,297, filed Aug. 10, 2006, which claims the benefit of priority to U.S. Provisional Application No. 60/707,657 filed on Aug. 11, 2005, which applications are incorporated herein by reference.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright. COPYRGT. 2006 Level 3 Communications, Inc.

TECHNICAL FIELD

Embodiments of the present invention generally relate to network-based communication. More specifically, embodiments relate to creation and use of signatures that are characteristic of network communications.

BACKGROUND

Today, network service providers (NSPs) provide networks and communication services to facilitate communications, such as Voice over Internet Protocol (VoIP) calls. Millions of calls take place everyday. In most cases, the calls occur without any problems. For example, typically a caller calls another person, the call is successfully set up, the participants have a conversation, and the call is successfully torn down when one of the participants disconnects. However, not all calls occur without problems. For example, the call may not be set up or torn down properly. These and other problems can occur for any number of reasons. Failure of calls to complete can indicate network problems, such as device failure, incompatibility, or misconfiguration. As such, NSPs should identify problematic calls and determine the reason(s) for the problems in order to provide quality communication service. However, given the vast number of calls attempted everyday, and the network complexities involved, call problem identification and analysis can be a daunting task.

NSPs have traditionally dealt with call problem identification in different ways. Sometimes NSPs do not monitor for call success or failure, but merely react to problems when they are notified of them. For example, subscriber complaints may prompt the NSP to identify and fix problems. Merely reacting to subscriber complaints is clearly not a prudent business model for providing quality communication service. As such, most NSPs would prefer to monitor for problems and fix the problems before they impact future calls. Unfortunately, conventional approaches have been inefficient, inflexible, and/or incomplete.

Another significant challenge to network problem monitoring and identification relates to physical changes in the network. This can include situations in which one NSP begins interfacing with another NSP or when an NSP switches network architecture. Typically when two NSPs interface their networks, they perform "interoperability" testing to ensure that the two networks operate properly together. Interoperability testing can be a very complicated task, given the complexity of the networks. After interoperability testing is complete, and the networks are working properly together, if one NSP switches to a different network architecture, this may necessitate more interoperability testing by interfacing NSPs. However, the NSP that has not switched network architecture will not want to invest the time and expense for additional interoperability testing merely to accommodate changes in the other NSP's network.

Another problem relates to extensibility in some communication or messaging protocols. For example, Session Initiation Protocol (SIP), which is often used to set up calls over VoIP networks, allows for variation in the definitions of message format and parameters. In SIP, for example, an NSP can define different message headers. As a result, multiple different types of messages may be communicated over the network. Some of the message definitions may result in failed calls. Message variation problems can be particularly relevant when switching to a new network architecture. Messages that worked on the first architecture may not work on a new architecture. Conventional systems cannot quickly or efficiently identify network problems that arise due, at least in part, to message variations.

SUMMARY

Embodiments of the present invention relate to systems and methods for automatically monitoring and classifying network communications. Monitoring network communications involves generating and analyzing transaction signatures. Transaction signatures can be classified as good or bad, which indicate success or failure of a transaction, respectively. Transaction signatures can be created using transaction elements, which may include signaling elements, header elements, or parameter elements. Identified signatures can be named, classified, and stored as signature patterns. The signature patterns can be used to analyze and classify future transaction signatures.

An embodiment of a method includes receiving a transaction signature composed of multiple transaction elements characteristic of a communication transaction, and determining whether the received transaction signature corresponds to a previously identified transaction signature pattern. If the received transaction signature does not correspond to a previously identified transaction signature pattern, the method involves creating a new transaction signature pattern, and classifying the new transaction signature pattern as one of a plurality of classifications indicative of completion or failure of the communication transaction.

An embodiment of a computer program product readable by a computer has instructions that cause the computer to carry out a process that includes receiving a transaction signature composed of multiple transaction elements characteristic of a communication transaction, and determining whether the received transaction signature corresponds to a previously identified transaction signature pattern. If the received transaction signature does not correspond to a previously identified transaction signature pattern, the process involves creating a new transaction signature pattern, and classifying the new transaction signature pattern as one of a plurality of classifications indicative of completion or failure of the communication transaction.

Another embodiment of a method for identifying successful and unsuccessful calls conducted over a packet network includes collecting messages associated with a selected call and forming a signature out of the collected messages by normalizing a parameter in at least one of the messages, so that the signature can be compared to known classified signature patterns with normalized parameters. Each of the signature patterns are classified as a good call signature or a bad call signature. The method can further include searching for a known signature pattern that corresponds to the formed signature, and if a known signature pattern is found that corresponds to the formed signature, classifying the formed signature with the classification associated with the corresponding known signature pattern. The method may still further include generating a new signature pattern based on the formed signature pattern and classifying the new signature pattern as either a good call signature or a bad call signature if a known signature pattern is not found that corresponds to the formed signature.

Another embodiment of a computer program product readable by a computer has instructions that cause the computer to carry out a process that includes collecting messages associated with a selected call and forming a signature out of the collected messages by normalizing a parameter in at least one of the messages, so that the signature can be compared to known classified signature patterns with normalized parameters. Each of the signature patterns are classified as a good call signature or a bad call signature. The process can further include searching for a known signature pattern that corresponds to the formed signature, and if a known signature pattern is found that corresponds to the formed signature, classifying the formed signature with the classification associated with the corresponding known signature pattern. The process may still further include generating a new signature pattern based on the formed signature pattern and classifying the new signature pattern as either a good call signature or a bad call signature if a known signature pattern is not found that corresponds to the formed signature.

Yet another embodiment of a method for use in performing interoperability testing between two network architectures includes steps of forming multiple transaction signatures that each characterizes a communication transaction conducted over the two networks and analyzing each of the transaction signatures to determine if the transaction signature matches a previously classified pattern. The method may further include generating a report identifying each of the communication transactions and indicating that each of the communication transactions is classified with a classification associated with a previously classified pattern or are of unknown classification. The method can be performed before a new or upgraded network architecture is put into operation in order to verify that the new or upgraded architecture will operate with minimal failed calls when put into operation.

Yet another embodiment of a computer program product readable by a computer has instructions that cause the computer to carry out a process that includes forming multiple transaction signatures that each characterizes a communication transaction conducted over the two networks and analyzing each of the transaction signatures to determine if the transaction signature matches a previously classified pattern. The process may further include generating a report identifying each of the communication transactions and indicating that each of the communication transactions is classified with a classification associated with a previously classified pattern or are of unknown classification.

While the invention is amenable to various modifications and alternative forms, specific embodiments have been shown by way of example in the drawings and are described in detail below. The intention, however, is not to limit the invention to the particular embodiments described.

DETAILED DESCRIPTION

Embodiments of the present invention relate to systems and methods for automatically monitoring and classifying network communications. Monitoring network communications involves generating and analyzing transaction signatures. Transaction signatures can be classified as good or bad, which indicate success or failure of a transaction, respectively. Transaction signatures can be created using transaction elements, which may include signaling elements, header elements, or parameter elements. Identified signatures can be named, classified, and stored as signature patterns. The signature patterns can be used to analyze and classify future transaction signatures.

Prior to describing one or more preferred embodiments of the present invention, definitions of some terms used throughout the description are presented.

Definitions

The term "transaction" is an interaction between two or more communicators over a network. A communicator may or may not be an endpoint in a transaction. In some cases, a transaction is a negotiation between the communicators to setup, carry on, or tear down a communication session. Some communication protocols, such as, but not limited to, Session Initiation Protocol (SIP), are transactional in nature. A transaction is composed of one or more transaction elements.

The term "transaction element" refers to a distinct constituent part of a transaction. In various embodiments, transaction elements are words in messages communicated in a transaction. Examples of transaction elements are primary words and secondary words.

The term "flow" refers to a series of one or more transactions associated with an attempted call. A flow may include, for example, and without limitation, a series of one or more signaling messages.

The term "transaction signature" is a signature formed from one or more transactions. As such, a transaction signature is a combination of transaction elements characterizing the one or more transactions. A transaction signature may or may not be unique to a particular transaction or set of transactions. Multiple transactions can have the same transaction signature. A transaction signature may be a concatenation of the transaction elements of the associated transaction(s) or the transaction signature may be some other combination (e.g., algorithmic combination, mathematical combination, etc.) of the transactional elements.

The term "word" refers to a distinct meaningful element in communication. Words are made up of symbols, which may be, without limitation, alphabetical or numerical. By way of example, but without limitation, INVITE, ACK, BYE, 100, 404, 503, FROM, and TO are words in SIP messages.

The term "primary word" refers to the principal word in a message. Examples of primary words are INVITE, ACK, and BYE.

The term "secondary word" refers to a subordinate word in a message. Examples of secondary words are FROM, TO, and parameters of the message.

The term "start line signature" is a primary word signature formed from words in the start line of SIP messages. Examples of SIP signaling elements include, without limitation, INVITE, ACK, and 404.

The term "header signature" is a secondary word signature that includes one or more header elements in one or more SIP messages. Examples of header elements are, without limitation, FROM and TO.

The term "parameter signature" is a secondary word signature that includes one or more parameter elements in one or more SIP messages. Examples of parameter signatures are, without limitation, header parameter signatures and Session Description Protocol (SDP) parameter signatures. In some cases, parameter signatures are formed through a process of normalization of symbols in message parameters.

The term "pattern" refers to a model set of things. By way of example, and without limitation, a pattern can be a model set of symbols or words.

The term "signature pattern" refers to an identified pattern of transaction elements. Typically, signature patterns correspond to signatures that have occurred in previous transactions, and which can be recognized when they occur again. Once one or more signature patterns have been identified, a transaction signature captured on the network can be analyzed to determine if the transaction signature fits a signature pattern.

A "module" is a self-contained functional component. A module may be implemented in hardware, software, firmware, or any combination thereof.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The terms "responsive" and "in response to" includes completely or partially responsive.

The term "computer-readable media" is media that is accessible by a computer, and can include, without limitation, computer storage media and communications media. Computer storage media generally refers to any type of computer-readable memory, such as, but not limited to, volatile, non-volatile, removable, or non-removable memory. Communication media refers to a modulated signal carrying computer-readable data, such as, without limitation, program modules, instructions, or data structures.

Exemplary System

One or more exemplary implementations are described herein for forming and classifying signatures in accordance with embodiments of the present invention. However, it will be understood that many other implementations are possible in accordance with other embodiments of the present invention. The particular embodiment may be used where, for example, it is desirable to identify the effects of changing an underlying network architecture. To insure minimal impact, it may be used to determine how customers are using the network, including how the customers are potentially extending known transaction protocols.

Although the signature formation ideas described herein could be applied to many protocols and environments, for illustrative purposes, embodiments of the invention relate to Session Initiation Protocol (SIP). Prior to discussing particular embodiments of systems, methods, and computer-readable media, a brief overview of SIP is provided. SIP is used to set up Voice over Internet Protocol (VoIP) calls. SIP messages are either requests or responses. The general format of a SIP message is: start line, one or more header fields, an empty line, and an optional message body. Each header line can include parameters. SIP allows for variation in the message format and the parameters allowed.

Transactions are formed from transaction elements in SIP messages. Below are two exemplary transactions:

(1) <-INVITE, ->100, ->200, <-ACK
(2) <-BYE, ->200
(3) <-INVITE, ->100, ->404, <-ACK

Transaction (1) above represents a transaction to set up a call. Transaction (1) indicates that the call was successfully set up based on the elements of the transaction. Transaction (2) above represents a transaction to terminate a call. The elements of transaction (2) indicate that the call was successfully terminated. Transaction (3) above represents a transaction to set up a call. The elements, and in particular element 404, indicates that the call was not successfully set up. SIP word 404 means that the called party could not be reached. Each of the transaction elements shown above have a direction, shown with arrows.

Further understanding can be gained by using other transaction elements. For example, it may be desirable to break the SIP messaging down in the following areas:
Signaling with SDP payload information
Headers being used
Parameters being used within each header
SDP parameter signatures
Signaling with SDP payload The elements of the transaction, as well as their order and direction, can be indicative of success or failure of a call. As such, embodiments of systems described herein form "transaction signatures" that characterize communication transactions. Using transaction signatures, automated processes can be used to quickly and efficiently monitor and analyze large numbers of calls. For example, the occurrence of many failing transaction signatures can be indicative of a network problem, a location of a network problem, a source of the network problem (e.g., a particular network service provider or equipment), and so on. As such, problems can be proactively identified and addressed before the problems adversely affect more calls. Conversely, occurrence of successful transaction signatures are indicative of correct network operation. Particular embodiments are now described in detail.

Figure 1:
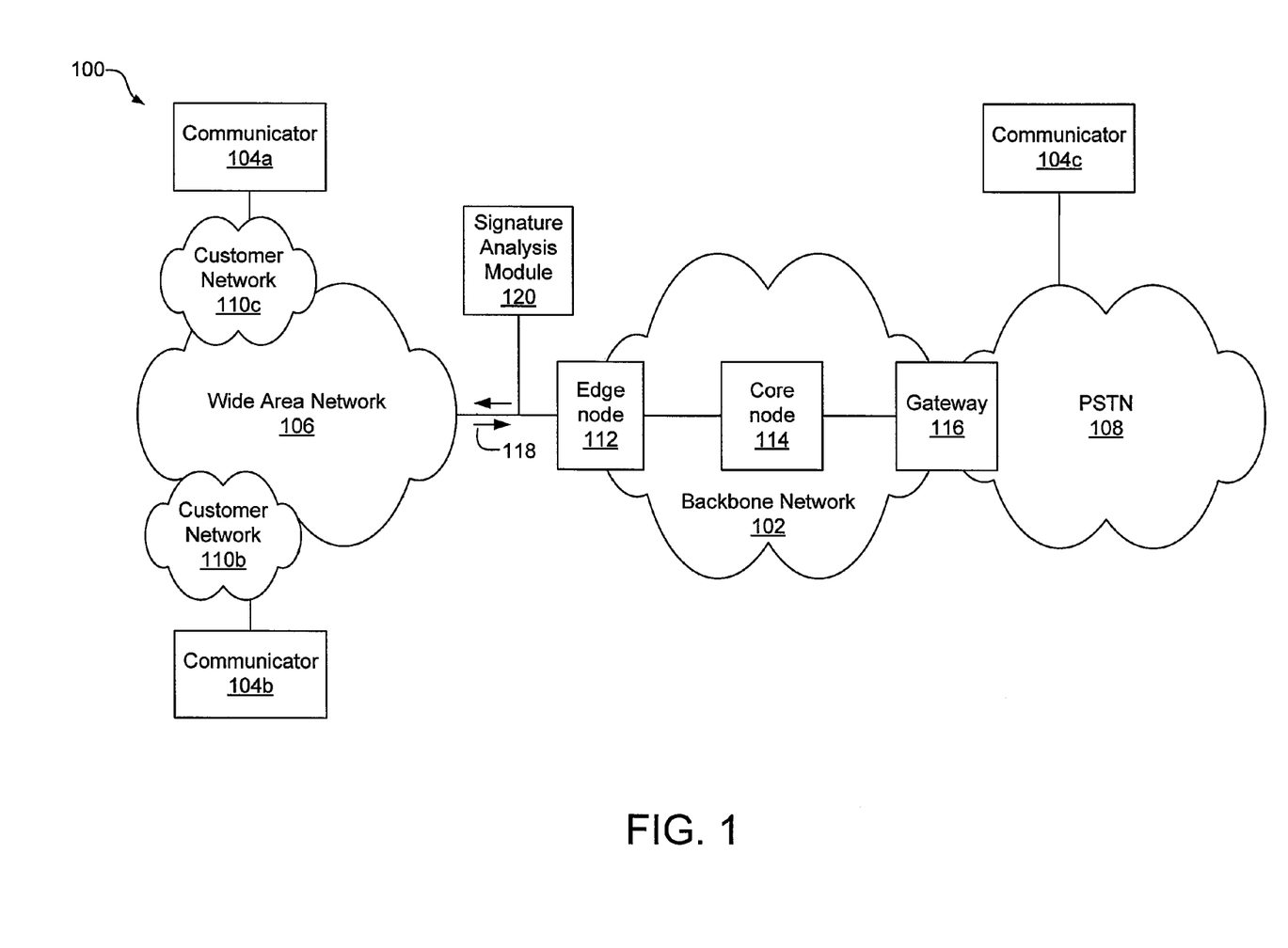
FIG. 1 illustrates an exemplary operating environment within which embodiments of the invention can operate to perform flow signature creation and analysis.

FIG. 1 illustrates an exemplary operating environment 100, which is suitable for employing flow signature formation and analysis. Flow signatures can be created based on transactions that occur within the environment 100. A flow signature is characteristic of an associated transaction and can be classified with one of multiple classifications. Signature types and their classifications can be indicative of network performance. As such, reports can be generated based on the signatures to form a better understanding of network performance. In addition, new or upgraded network architectures (e.g., new/upgraded device types, models, manufacturers, interconnections, configurations, network arrangements, etc.) can be tested and validated prior to putting them into operational service.

Turning to the operating environment 100 of FIG. 1, there is shown a backbone network 102 that facilitates communication between communicators 104. The communicators 104 typically include telephonic and/or computing equipment that communicate via the backbone network 102, as well as one or more other networks, such as a wide area network (WAN) 106 or a public switched telephone network (PSTN) 108. Communicator 104a can access the WAN via a customer network 110a and communicator 104b can access the WAN via 110b.

In accordance with the illustrated embodiment, the WAN 106 is an Internet protocol (IP) network, such as the Internet. The backbone network 102, which is also an IP network, is configured to service voice over IP (VoIP) calls. The backbone network 102 includes various devices, such as an edge node 112, a core node 114, and a gateway 116. An example of an edge node 112 is an edge proxy server. An example of a core node 114 is a core proxy server. The backbone network 102 also typically includes routers (not shown), gatekeepers (not shown), and other devices, which transfer communications between the communicators 104 or other communicators on the networks. It should be appreciated that the various components of the backbone network 102 shown in FIG. 1 are exemplary in nature and may be replaced or supplemented with any number and type of other components to perform like functionality.

For example, if the communicator 104a is communicating with the communicator 104b, communications from the communicator 104a are routed through the customer network 110a and the WAN 106 to the backbone network 102, which then routes the communications back through the WAN 106 and the customer network 110b to the communicator 104b. As another example, if the communicator 104a is communicating with the communicator 104c, communications from the communicator 104a are routed through the customer network 110a and the WAN 106 to the backbone network 102, which then routes the communications out the gateway 102 to the PSTN 108, which directs the communications to the communicator 104c.

Network communicators are not limited to end user communicators. For example, the edge node 112, the core node 114, the gateway 116, routers (not shown), and other communication devices within the networks can be considered to be communicators.

In the illustrated embodiment, one or more communication protocols are used. These protocols include, but are not limited to, Session Initiation Protocol (SIP), Session Description Protocol (SDP), and SIP for telephones (SIP-T). For example, the communicators 104a, 104b communicate using VoIP equipment, such as VoIP telephones or terminal adaptors, which use SIP and SDP.

SIP is a transactional protocol. As such, transactions are performed to set up and tear down calls. SIP messages 118 are used to negotiate call completion and termination. The SIP messages are communicated to and from the edge node 112 to communicators 104 and the core node 114. Transactions carried on between the communicators can be captured by a signature analysis module 120. The signature analysis module 120 can create transaction signatures using the SIP messages. The signatures can be analyzed and classified to provide valuable information about call completion rates, and/or network performance.

Figure 2:
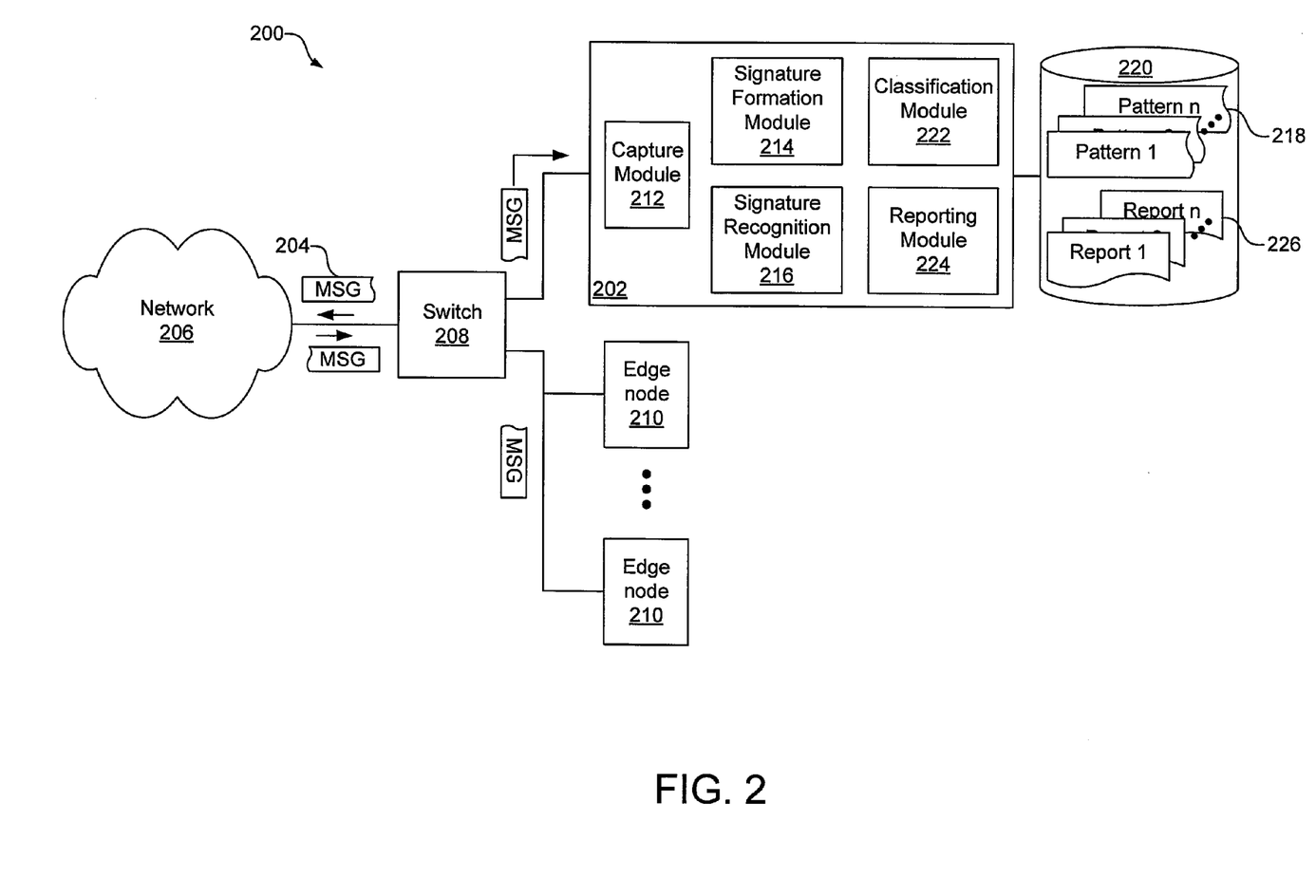
FIG. 2 illustrates one possible embodiment of a signature analysis module in relation to other components of the operating environment of FIG. 1.

FIG. 2 illustrates an exemplary embodiment of a signature analysis module 202 in relation to other components within one possible network configuration 200 using SIP. SIP messages 204 coming from a network 206 go through a switch 208. Similarly, messages going to the network 206 go through the switch 208. Via the switch 208, messages 204 are communicated to and from one or more edge nodes 210. In one embodiment, the switch 208 includes a mirrored port, such that messages from the network 206 and the edge nodes 210 are communicated to the signature analysis module 202.

The signature analysis module 202 includes a capture module 212 that is operable to receive messages and make data from the messages available to other modules in the signature analysis module 202. Messages are captured for associated transactions. When the capture module 202 receives a message, the capture module 202 determines which transaction the message is associated with, based on transaction identifiers.

The signature analysis module 202 includes a signature formation module 214 that uses transaction elements from SIP messages captured by the capture module 212 to create signatures associated with transactions. The transaction elements are words (e.g., primary words or secondary words), such as start line, header(s), header parameter(s), and/or SDP parameters. Transaction signatures are formed from a combination of transaction elements. The combination could be a concatenation of the elements or another combination, such as an algorithmic transformation (e.g., checksum) of the elements.

In the illustrated embodiment, a signature recognition module 216 attempts to recognize created signatures formed by the signature formation module 214. One embodiment of the signature recognition module 216 examines formed signatures using one or more predetermined signature patterns 218. The signature patterns 218 may be stored in memory, such as a database 220. Each signature pattern 218 has an identifier and a classification. In one embodiment, possible classifications are GOOD and BAD. A GOOD pattern is a signature pattern that has been determined to be associated with successfully completed calls, whereas a BAD pattern is a signature pattern that has been determined to be associated with failed calls. Other classifications could be used, depending on the particular embodiment.

In one embodiment, the signature recognition module 216 compares each signature formed by the signature formation module 214 to the signature patterns 218. If a corresponding pattern is found, the signature is classified with the classification of the corresponding signature pattern. For example, if the corresponding signature pattern is classified as GOOD, the transaction signature is classified as GOOD. If a corresponding signature pattern is not found, a new signature pattern is created using the transaction signature that was formed by the signature formation module 214. The new signature pattern is given an identifier (e.g., a name), and is classified.

A classification module 222 provides functionality for classifying signature patterns as being one of multiple classifications. The classification module 222 can automatically classify new signature patterns if an automatically identifiable condition exists. An automatically identifiable condition could be, for example, call completion or call failure. In the case of a completed call, the new signature pattern is classified as GOOD; in the case of a failed call, the new signature patter is classified as BAD.

If an automatically identifiable condition does not exist, the classification module 222 can flag the signature as unknown. Signatures that are flagged as unknown are manually classified. For example, a network administrator can analyze a new signature to determine if it is indicative of a failed call (BAD) or a successful call (GOOD). After a new signature pattern is classified, the classification module 222 stores the new signature pattern in the database 220 with its name and classification.

A reporting module 224 gathers signature-related data from other modules in the signature analysis module 202 and automatically generates reports 226. The reports 226 can include the signatures that were formed during operation, their classifications, an indication as to whether a signature is known or unknown (e.g., no corresponding signature pattern), the times of the calls, the parties involved, the customer networks involved, and/or others. For example, if a signature is formed that has no corresponding predetermined pattern, the reporting module 226 can mark the formed signature as being UNKNOWN or similar indicator. The reporting module 224 can analyze data and produce reports in a batch mode at a specified time of day, or continually as data is gathered and signatures are formed and analyzed.

FIG. 2 illustrates only one of many possible configurations. The components of FIG. 2 can be combined, broken out, or reorganized in many different ways, depending on the particular implementation. For example, the signature analysis module 202 may be included in the edge nodes 210, whereby a separate switch 208 would not be necessary. As another example, the patterns and reports need not be stored in a database, but rather could be stored in any other type of memory. The database 220 may be implemented as multiple databases and/or other memory. The data model used by the database(s) 220 is not limited to any particular data model. As such, flat, relational, hierarchical, object oriented, or other data models could be used.

Exemplary Operations

Figure 3:
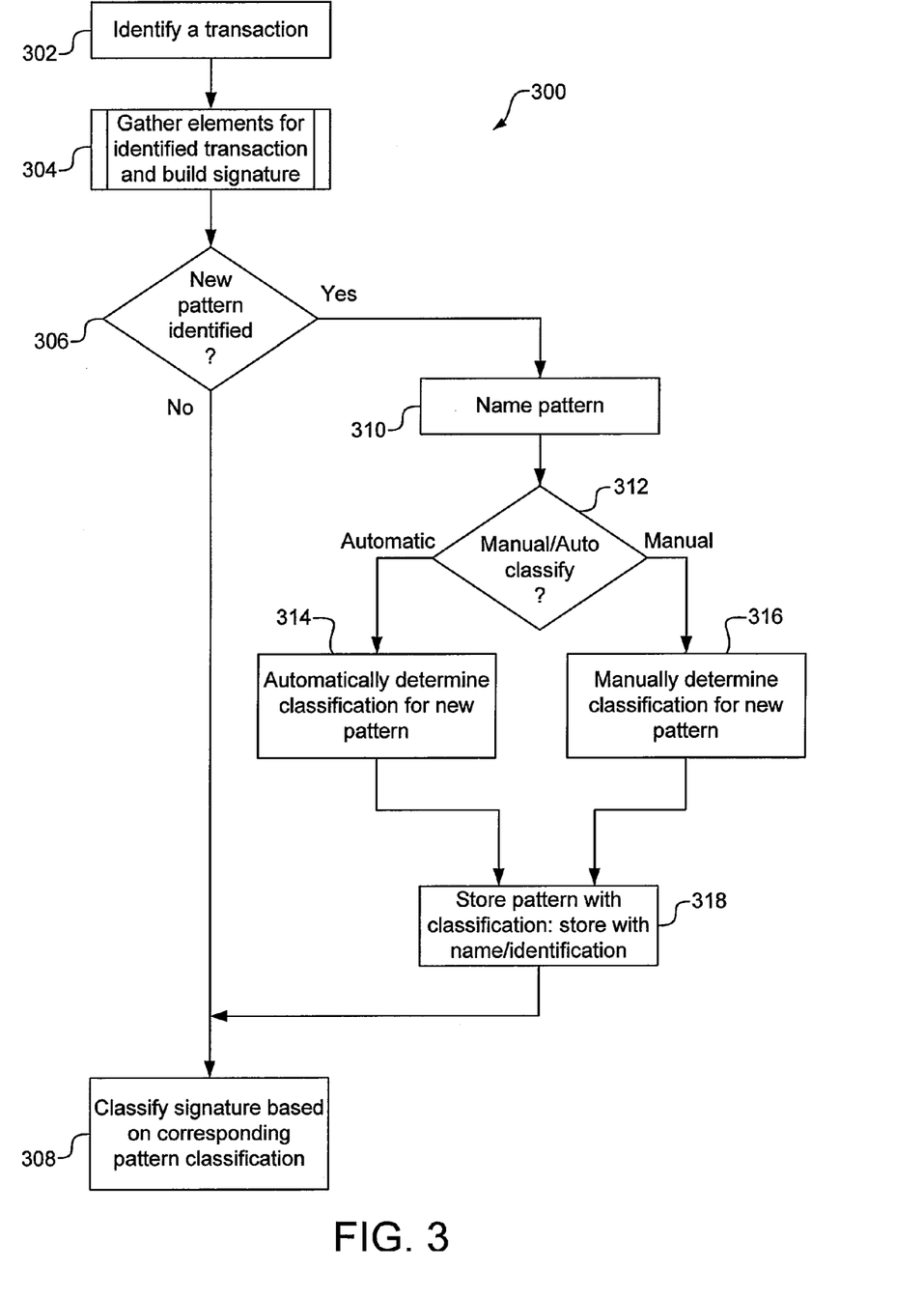
FIG. 3 is a flowchart illustrating an algorithm for analyzing a signature created from a captured set of transaction elements.

FIG. 3 is a flowchart illustrating a flow signature classification algorithm 300 for classifying a transaction signature created from a captured set of transaction elements in accordance with one embodiment. The embodiment illustrated relates to SIP; however, other implementations could be adapted to other communications protocols.

Initially, a transaction is identified for flow signature analysis in an identifying operation 302. The identifying operation 302 assigns a transaction identifier (ID) to the transaction. In some cases, this may be a call ID assigned to a Voice Over IP (VOIP) call. In other cases, it may be another identifier that may be used to group constituent parts of an ongoing transaction.

A gathering and building operation 304 gathers transaction elements associated with the identified transaction and builds a signature associated with the identified transaction. The signature can be built in many different ways, using one or more of the transaction elements, in various combinations. Exemplary embodiments of the gathering and building operation 204 are illustrated in FIGS. 4-7, and described in detail below.

After the transaction elements are gathered and the transaction signature is built, a query operation 306 determines whether the built signature corresponds to a new signature pattern. A new signature pattern is one that has not been identified in the past. In one embodiment, the query operation 306 compares the built transaction signature with previously identified signature patterns to determine whether the signature is new, or whether the signature has been previously observed. If the pattern of the transaction signature has been observed, the algorithm 300 branches "No" to a classifying operation 308. The classifying operation 308 classifies the transaction signature based on the classification of a corresponding predetermined signature pattern.

If the pattern associated with the transaction signature is new, the algorithm branches "Yes" to a naming operation 310. The naming operation 310 names the new signature pattern for later identification purposes. Another query operation 312 determines whether the new signature is to be manually classified or automatically classified. As one example, a particular signature may be associated with an automatically identifiable condition such as a call failure or a call complete. In such a case, the signature may be amenable to automatically identifying classification, and the algorithm 300 branches "Automatic" to an automatically determining operation 314. Such call classifications may be, for example, GOOD if the call completed and BAD if the call failed. An example of a BAD signature pattern is as follows:

->INVITE,<-100 Trying,<-404,->ACK

In the foregoing example, the called number is not found and the call was not set up, as indicated by the primary word "404". Therefore the pattern is classified as BAD. By contrast, the follow exemplary signature pattern is classified as GOOD:

->INVITE,<-100,<-200,->ACK,->BYE,<-200.

Alternatively, the query operation 312 may determine that the signature pattern does not lend itself to adequate classification using automatic classification. If an automatically identifying condition is not available, a manually determining operation 316 manually determines whether the signature pattern is indicative of a GOOD transaction or a BAD transaction. Manually determining operation 316 typically involves flagging or marking the new signature pattern as unidentified or a similar indicator, so that a network administrator can review the signature pattern and make a determination as to whether the call succeeded (GOOD) or failed (BAD).

A storing operation 318 then adds the newly identified signature pattern to a database of known signature patterns. The classifying operation 308 then classifies the call signature as GOOD or BAD based on the determined classifications. Thus, as just one example, a particular signature may be identified as failing twenty percent of the time based on the aforementioned analysis. As another example, a particular signature may be identified as failing to be properly billed a certain percentage of the time.

Figure 4:
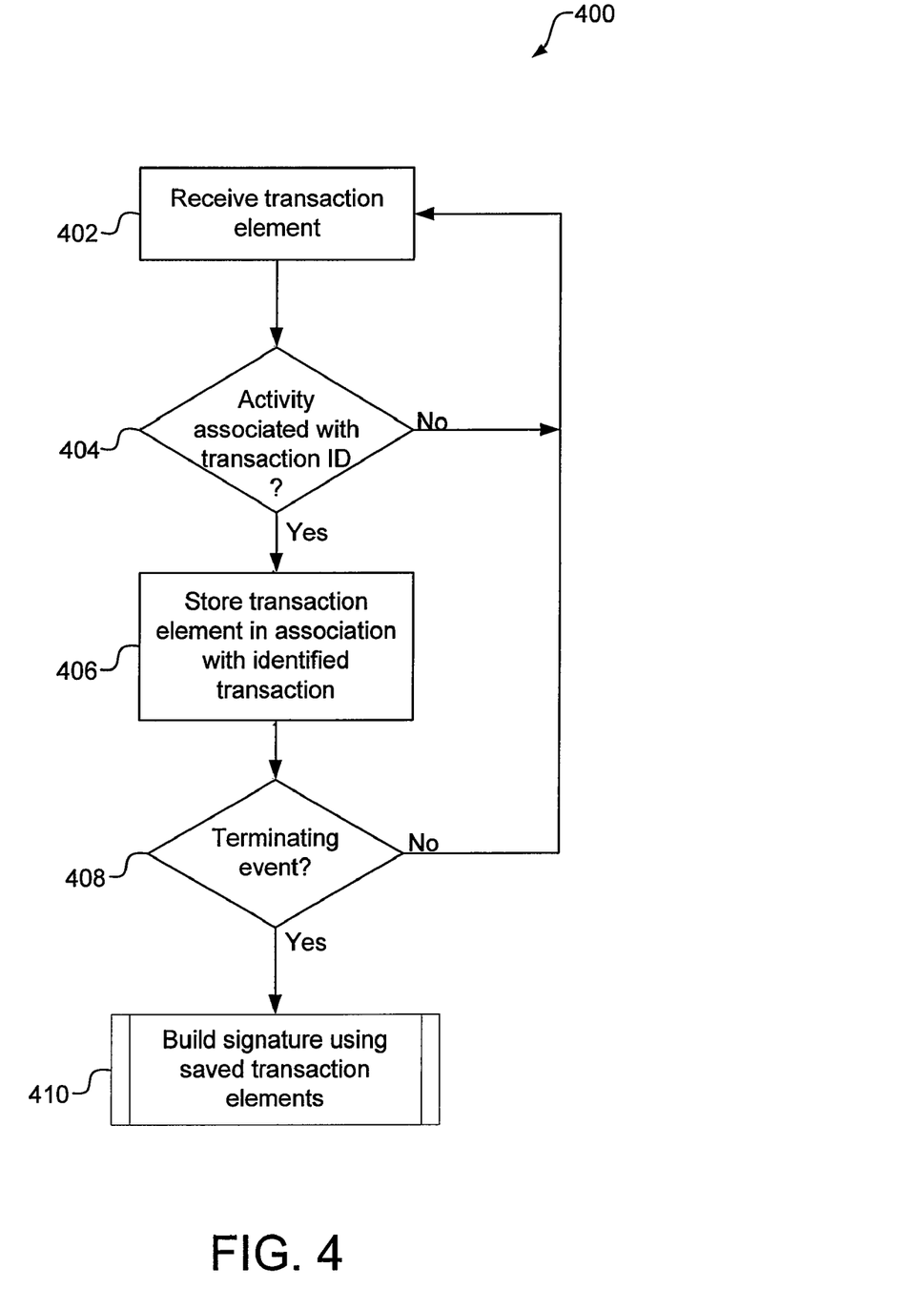
FIG. 4 is a flowchart illustrating an algorithm for capturing transaction elements associated with an identified transaction.

FIG. 4 is a flowchart illustrating an algorithm 400 for capturing transaction elements associated with an identified transaction. The algorithm 400 may be used to implement the gathering and building operation 304 of FIG. 3. Upon entry into the algorithm 400, it is assumed that a transaction ID is specified that identifies the transaction for which transaction elements (e.g., SIP words) are being gathered and a signature is being created.

In a receiving operation, one or more transaction elements, such as elements in a SIP message, are received. A query operation 404 determines whether the transaction element(s) is/are associated with the specified transaction ID. If the transaction element(s) is/are not associated with the specified transaction ID, the algorithm 400 branches "No" to the receiving operation 402 where other transaction element(s) is/are received. However, if the transaction element(s) is/are associated with the specified transaction ID, the algorithm branches "Yes" to a storing operation 406.

The storing operation 406 stores the transaction element(s) in association with the transaction ID. The stored transaction element(s) will be used later to create a transaction signature. Another query operation 408 then determines if a terminating event has occurred in relation to the identified transaction. A terminating event could be, for example, a final acknowledge at the end of the transaction, a call hang up where the transaction is a telephone call, a predefined pattern of events, and/or the like. If a terminating event is not found in the query operation 408, the algorithm 400 branches "No" back to the receiving operation 402 which receives other transaction element(s).

Alternatively, where a terminating event is found, a building operation 410 builds a signature that is formed based on the stored transaction element(s) associated with the identified transaction. The building operation 410 can build various different types of signatures, depending on the implementation. In some embodiments, the building operation 410 builds one or more of a start line signature, a header signature, and a parameter signature. This signature may be, for example, a concatenation of all or some subset of the messages passed in relation to the transaction ID, but leaving any data or sub messages out. Alternatively, the signature may be a concatenation of all SIP messages. As yet another alternative, the signature may be a concatenation of all SIP messages and associated headers. As yet a further alternative, the signature may be a concatenation of all SIP messages, associated headers, and associated header parameters. Yet further, the signature may be a concatenation of all SIP messages, associated headers, associated header parameters, and/or an indication of whether a session description protocol (SDP) package is included with one or more of the aforementioned.

Figure 6:
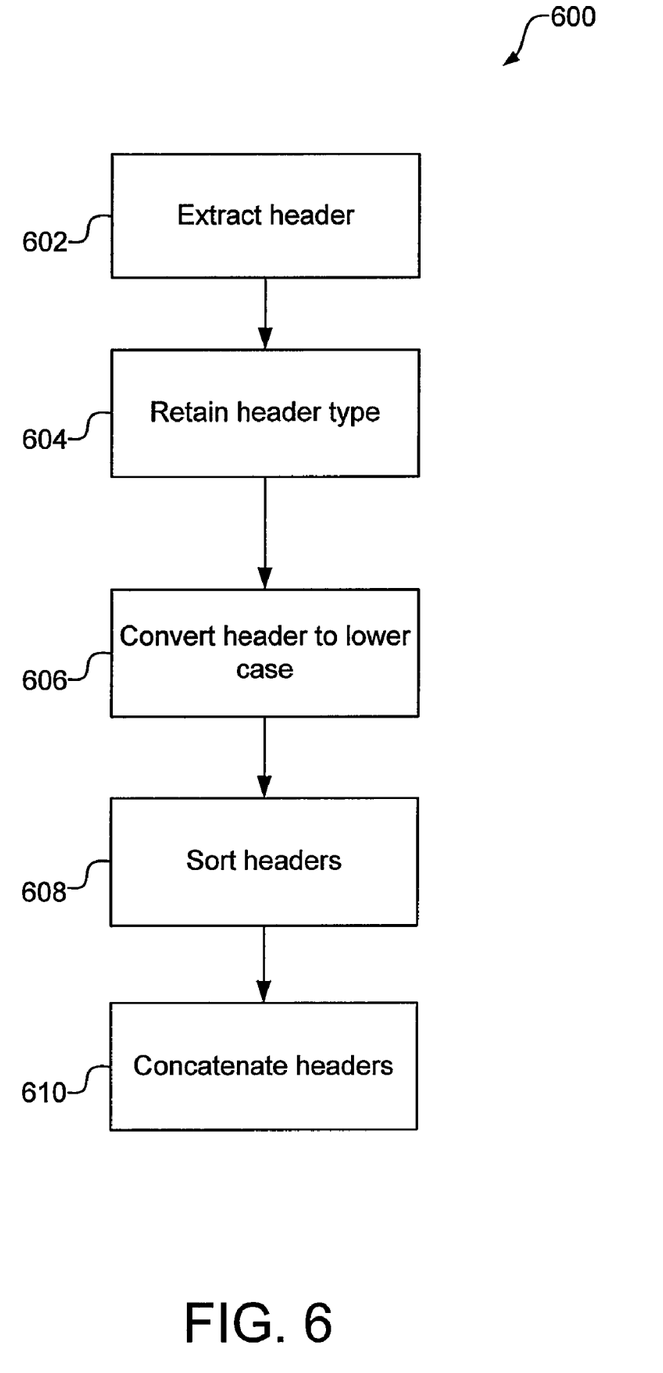
FIG. 6 is a flowchart illustrating an algorithm for creating a header signature using captured transaction elements.
Figure 7:
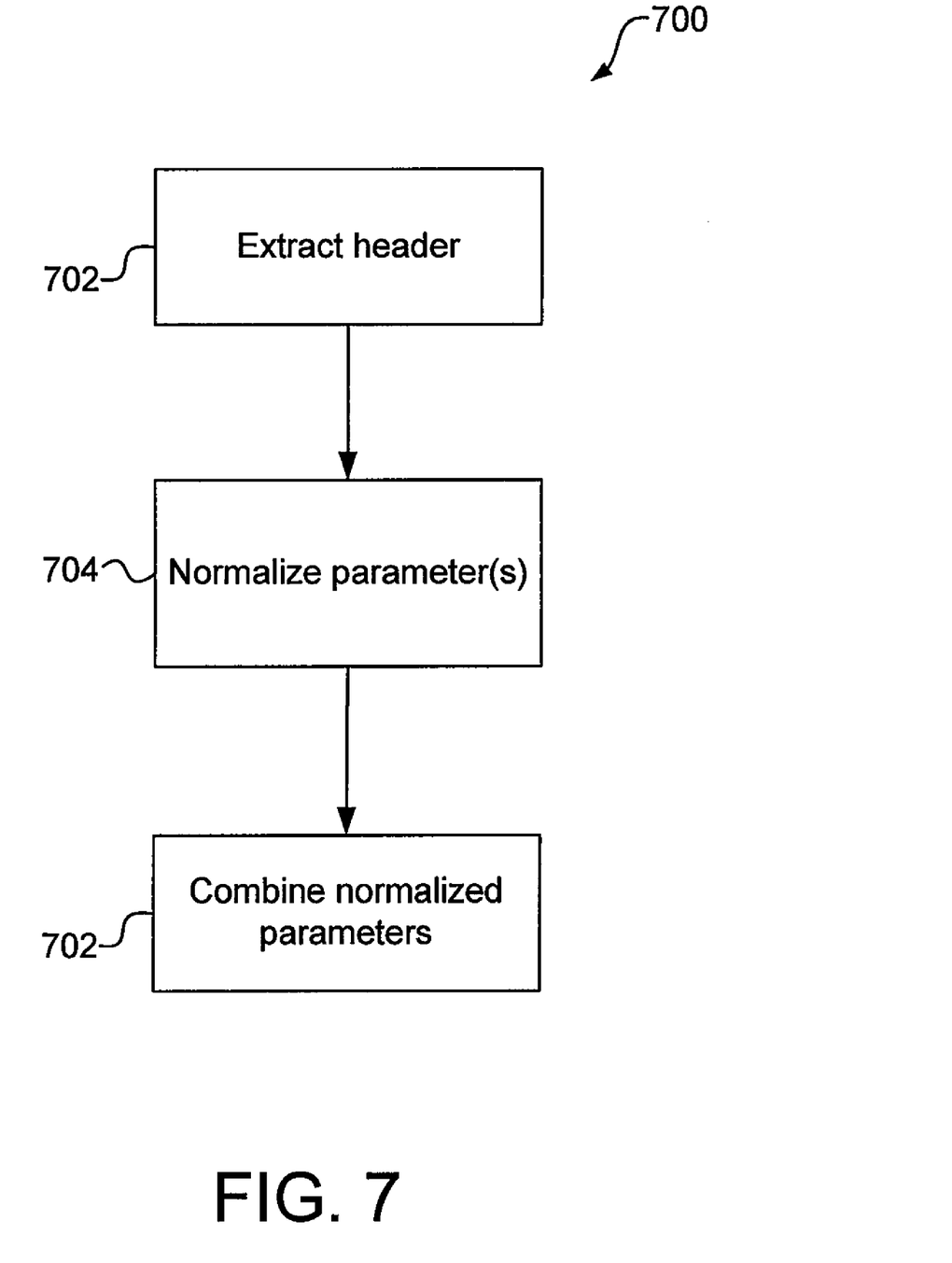
FIG. 7 is a flowchart illustrating an algorithm for creating a parameter signature using captured transaction elements.

Based on the disclosure provided herein, one of ordinary skill in the art will recognize a variety of signatures that may be formed based on elements of a particular transaction that would accord with one or more embodiments of the present invention. Exemplary embodiments of the building operation 410 are illustrated in FIGS. 5-7, and are described below.

In will be understood by those skilled in the art that the particular order of operations shown in FIG. 4 could be modified without departing from the scope of the invention. For example, in other embodiments the building operation 410 could be performed on a substantially "real time" or "on-the-fly" basis, wherein signatures are built as the transaction elements are received, rather than storing all the transaction elements associated with the transaction ID prior to forming the signature.

Figure 5:
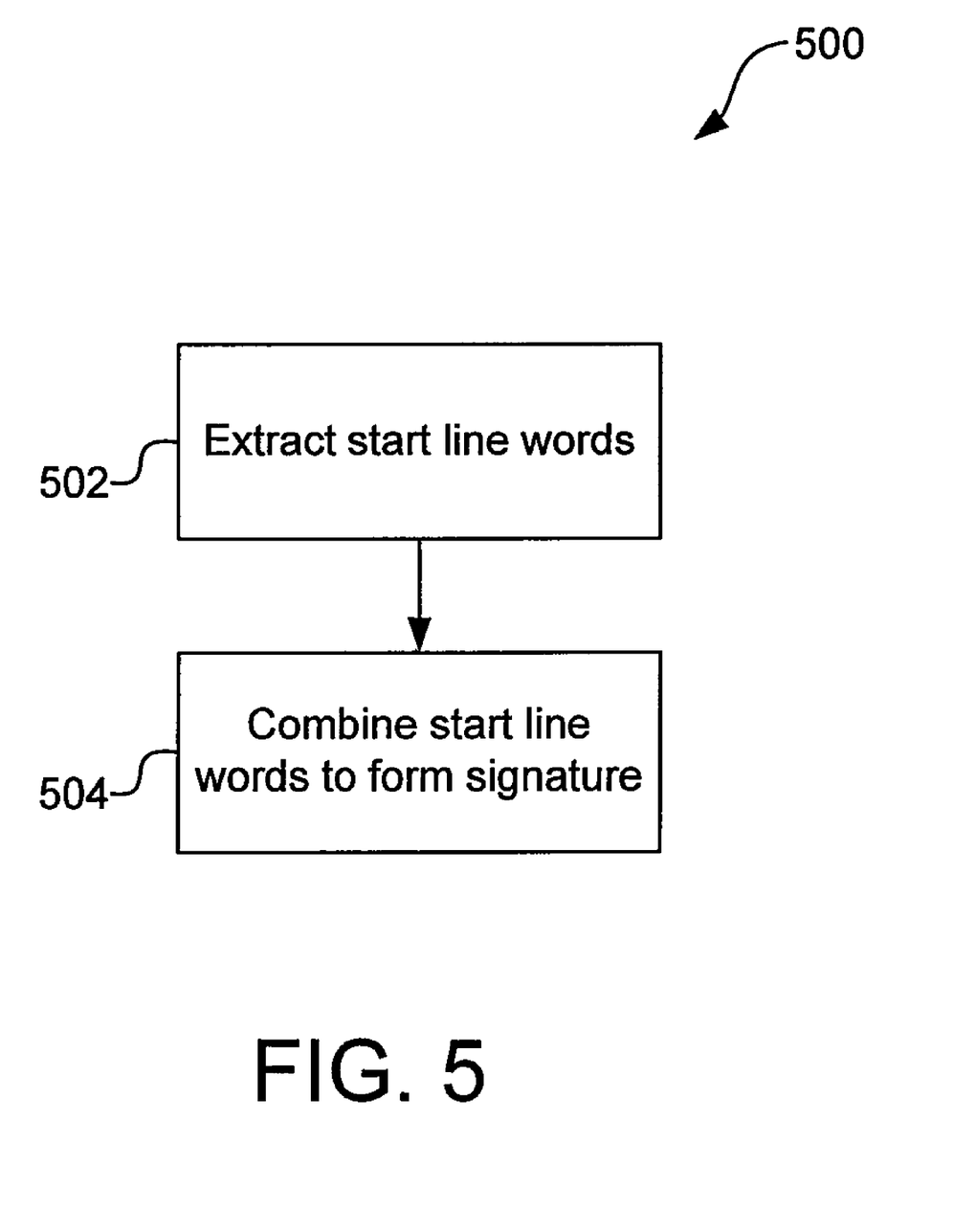
FIG. 5 is a flowchart illustrating an algorithm for creating a signaling or start line signature using captured transaction elements.

FIG. 5 is a flowchart illustrating a signature formation algorithm 500 for creating a start line signature using start line words in captured transaction elements in a SIP implementation. The algorithm 500 is an exemplary embodiment of the building operation 410 in FIG. 4.

An extracting operation 502 extracts start line words from the SIP messages associated with the transaction ID. The start line words may be, for example, INVITE, 100, 183, ACK, etc. A combining operation 504 then combines the extracted start line words to form the transaction signature. An exemplary transaction and start line signature formation is shown below to illustrate:

| MessageCustomer | Edge Proxy Server |
|---|---|
| INVITE | -----> |
| 100 Trying | <----- |
| 183 Session Progress | <----- |

-continued

| MessageCustomer | Edge Proxy Server |
|---|---|
| 200 OK | <----- |
| ACK | -----> |
| BYE | -----> |
| 200 OK | <----- |

The above table is a call tree illustrating communication messages between an edge proxy server and a customer. The call tree can be reduced to the following signature:
->INVITE,<-100,<-183,<-200,->ACK,->BYE,<-200

The illustration above could be applied to communications between other network communicators, such as between an edge proxy server and a core proxy server.

The combining operation 504 may combine the start line words in any useful manner, such as concatenation or an algorithmic transformation. An example of algorithmic transformation is performing a checksum over the start line words. For example, MD5 checksum can be generated. A checksum will produce a particular value, which can be used to identify the signature. Other combinations can be used.

Header Signatures

FIG. 6 is a flowchart illustrating a header signature creation algorithm 600 for creating a header signature using captured transaction elements. Each SIP message may be composed of various headers, some of which are required and some of which are not. To understand the messaging, it may be desirable to know what headers are being used for a given call flow. A given transaction signature may have many different header variations. As such, the start line signature may be viewed as a major category and the header signature may be viewed as a minor category. The following are examples of Headers:
Accept:
Allow:
Anonymity:
Cseq:
Call-ID:
Contact:
Date:
From:
Privacy:
Reason:
Server:
To:
Via:

Referring particularly to FIG. 6, header signature creation begins with an extracting operation 602 that extracts headers from SIP messages. A retaining operation 604 retains the header type. For example the following header:
From: <sip:+14045125623@209.244.23.197:5060>; tag=aQuT897x9CelK can be reduced to From:. In other words, the word From: is retained.

This extracting 602 and retaining operation 604 process is typically repeated for each header within the SIP message. In a converting operation 606, the extracted headers are converted to lower case. Header order is generally not important in SIP. As such, a sorting operation 608 sorts the headers. A concatenating operation 610 then concatenates the extracted headers together.

A Session Description Protocol (SDP) component may exist in a header. The SDP component of the message, if any, may processed by extracting the SDP header portion and concatenating it together to form a simple SDP header signature.

For example, given the following SDP:
v=0
o=−1118415785 1118415790 IN IP4 209.244.16.205
s=−
c=IN IP4 209.244.16.205
t=0 0
m=audio 60550 RTP/AVP 18 0 101
a=rtpmap:101 telephone-event/8000
a=fmtp:101 0-15

The signature can be reduced to v, o, s, c, t, m, a, a. In this case, order is important so the data is not sorted. This may be further reduced by building a dictionary of known SDP signatures and assigning a number to any new signatures. To illustrate, the foregoing exemplary SDP signature might become, for example, sdp-1.

Transaction signatures can be formed that are composed of start line words and header words. In addition, the directionality and SDP signature, if any, may then added to the signature. To illustrate, an exemplary transaction signature could be produced according to the following format:
   invite;customer->eps;accept:,allow:,cseq:,call-id:,contact,
      content-length:,content-type:,diversion:,from:,record-
      route:,max-forwards:,proxy-require:,remote-party-id:,
      rpid-privacy:,sdp-1,supported:,to:,via:,via:

A dictionary of known transaction signatures can be built to simplify identification of signatures. One embodiment involves assigning each new signature a name. The name can be based on the message type (e.g., start line word), wherein includes a number if the message type starts with a letter and a letter if the message type starts with a number. The previous example might become INVITE-1.

Multiple transactions may occur for a given call. After transaction signatures are created for all the transactions, a transaction signature for the entire call can be generated as a combination of all the transaction signatures. For example, start line and header signatures can be concatenated, producing a more complete picture of the call flow. Continuing with the example above, the entire call may result in the following signature:
   INVITE-1;100-a;183-a;200-a;ACK-1;BYE-1;200-b To additionally characterize the transaction signature, SDP information can be included in the signature. For headers that include SDP payload, an SDP indicator can be included. The indicator may be, for example, w/SDP (with SDP). Using this indicator, the earlier exemplary signature might become:
   ->INVITE w/SDP,<-100 Trying,<-183 Session Progress
      w/SDP,<-200 OK w/SDP,->ACK,->BYE,<-200 OK Signatures such as the foregoing exemplary signature can allow a network provider to see where the SDP negotiations are within a given call flow. The signature may further be simplified by keeping a dictionary of previously seen transaction signatures and assigning a sequential number to each new signature seen. Call flows can be rapidly categorized by transaction signature in this manner. In addition, signatures in the foregoing exemplary format can be compared in an automated fashion and/or by hand.

Header Parameter Signatures

FIG. 7 is a flowchart illustrating a parameter signature creation algorithm 700 for creating a parameter signature using captured transaction elements. Parameters are parts of headers in a SIP message. Parameters can vary depending on the particular called number, but parameters typically abide by a basic format. As such, parameters can be used to create useful transaction signatures.

Initially, an extracting operation extracts the headers of the SIP messages in an extracting operation 702. Because parameter values can vary greatly, a normalizing operation 704 normalizes into comparable formats. For example, when it is received, each header can contain multiple parameters. The parameters can each be in one of the following formats:
1. URI based (there are many combinations of acceptable URI's)
2. Attribute=value where value is essentially different each time.
3. Attribute=value where value is a small, bounded number of values.

One embodiment of the normalizing operation 704 employs pattern-based substitution to put the foregoing forms into forms that can be compared.

To illustrate, the following is an example of form number 1:
From:
   <sip:+14045125623           @209.244.23.197:5060;
      user=phone>;tag=aQuT897x9 CelK This form contains a phone number in globalized format and an IP address. To effectively compare the URI based form with another From header, the URI portion of the header can is reduced, using a series of pattern substitutions, to the following:
From:
   <sip:+xxxxxxxxxx@yyy.yyy.yyy.yyy:port;user=phone>;
      tag=aQuT897x9Ce1K As shown in the foregoing example, the telephone number of the original header is replaced with "xxxxxxxxxx", and the URI is replaced with "yyy.yyy.yyy.yyy".

Form number 2 is illustrated using the tag=aQuT897x9Ce1K portion in the example above. In this case, pattern substitution is used to replace all known parameters using Form 2 with parameter=value. Therefore, normalization of the example above becomes:
   From:    <sip:+xxxxxxxxxx@yyy.yyy.yyy.yyy:    port;
      user=phone>;tag=value Form number 3 is demonstrated by the user=phone portion of the example above. It is useful to know all the variations in value in Form number 3. As such, in one embodiment, the elements of form 3 are not changed. As such, using the above example, the normalizing operation 704 might create the following normalized header with parameters:
   From:        <sip:+xxxxxxxxxx@yyy.yyy.yyy.yyy:port;
      user=phone>;tag=value Once a header with parameters is in it's normalized form, it can be categorized with other headers from the same message to provide a complete picture of how a call is using SIP signaling. A combining operation 706 combines these individual signatures for each header to form a a message parameter signature. In one embodiment, the combining operation 706 concatenates the headers with normalized parameters to form a message parameter signature.

As discussed above, a dictionary can be used to assign unique Ids to these message signatures. In turn, each message signature for a call may then be concatenated to form a single call signature that completely describes the SIP signaling, header and parameters used. This can also use the dictionary based approach described above to assign a single, easy to remember, comparable ID to the call. Using this methodology, calls may be categorized and new call flows can be called out for further examination. A network provider may use this analysis to build test cases around each unique call flow variation that our customers are currently using. If the tests pass on architectural changes in the lab, one can be reasonably confident that the architectural changes will work in actual operation.

The parameter signature creation algorithm 700 of FIG. 7 can be applied to generate SDP parameter signatures. In this manner, network providers can categorize how SDP is being used for RTP negotiation, including codecs requested and picked, media types, etc.

As an illustrative example, given the following SDP:
v=0
o=-1118415785 1118415790 IN IP4 209.244.16.205
s=-
c=IN IP4 209.244.16.205
t=0 0
m=audio 60550 RTP/AVP 18 0 101
a=rtpmap:101 telephone-event/8000
a=fmtp:101 0-15
it may be possible to use pattern based substitution to normalize the SDP as follows:
v=0
o=-session version IN IP4 yyy.yyy.yyy.yyy
s=-
c=IN IP4 yyy.yyy.yyy.yyy
t=0 0
m=audio port RTP/AVP 18 0 101
a=rtpmap:101 telephone-event/8000
a=fmtp:101 0-15

These lines are then concatenated to form a single string. A dictionary may be used as described above to reduce the signature to a single ID.

The accompanying Appendix includes code to provide an example of forming signatures based on signaling, Header data, and Header parameter data. The software is merely exemplary and that many other embodiments of the present invention are possible.

Exemplary Computing Device

Figure 8:
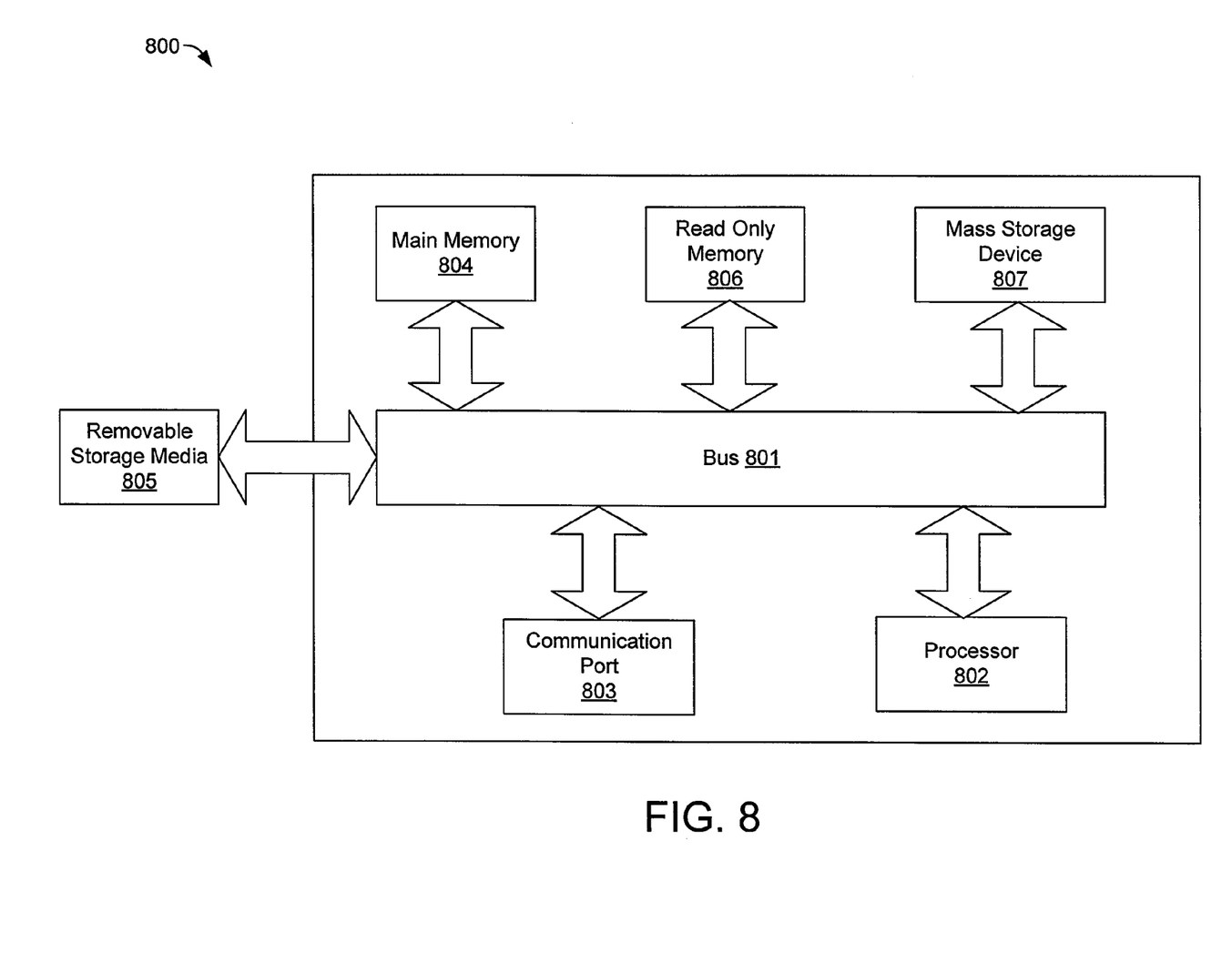
FIG. 8 illustrates computing device upon which embodiments of the present invention can execute.

FIG. 8 is a schematic diagram of a computing device 800 upon which embodiments of the present invention may be implemented and carried out. As discussed herein, embodiments of the present invention include various steps. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

According to the present example, the computing device 800 includes a bus 801, at least one processor 802, at least one communication port 803, a main memory 804, a removable storage media 805, a read only memory 806, and a mass storage 807. Processor(s) 802 can be any know processor, such as, but not limited to, an Intel® Itanium® or Itanium 2® processor(s), AMD® Opteron® or Athlon MP® processor(s), or Motorola® lines of processors. Communication port(s) 803 can be any of an RS-232 port for use with a modem based dialup connection, a 10/100 Ethernet port, a Gigabit port using copper or fiber, or a USB port. Communication port(s) 803 may be chosen depending on a network such a Local Area Network (LAN), Wide Area Network (WAN), or any network to which the computing device 800 connects. The computing device 800 may be in communication with peripheral devices (not shown) such as, but not limited to, printers, speakers, cameras, microphones, or scanners.

Main memory 804 can be Random Access Memory (RAM), or any other dynamic storage device(s) commonly known in the art. Read only memory 806 can be any static storage device(s) such as Programmable Read Only Memory (PROM) chips for storing static information such as instructions for processor 802. Mass storage 807 can be used to store information and instructions. For example, hard disks such as the Adaptec® family of SCSI drives, an optical disc, an array of disks such as RAID, such as the Adaptec family of RAID drives, or any other mass storage devices may be used.

Bus 801 communicatively couples processor(s) 802 with the other memory, storage and communication blocks. Bus 801 can be a PCI/PCI-X, SCSI, or USB based system bus (or other) depending on the storage devices used. Removable storage media 805 can be any kind of external hard-drives, floppy drives, IOMEGA® Zip Drives, Compact Disc-Read Only Memory (CD-ROM), Compact Disc-Re-Writable (CD-RW), Digital Video Disk—Read Only Memory (DVD-ROM).

Based on the disclosure provided herein, one of ordinary skill in the art will appreciate a myriad of behaviors that may be quantified using the presented approach. Further, based on the disclosure provided herein, one of ordinary skill in the art will recognize a variety of ways that the aforementioned information may be used. For example, the aforementioned information may be used in a proactive way to modify the design of a particular transaction network to achieve better performance. Alternatively, the aforementioned information may be used in a reactive way to cure identified failures in a network under test. Again, based on the disclosure provided herein, one of ordinary skill in the art will appreciate a variety of ways that the information may be used.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A system designed and operable to analyze communication sessions conducted over a network, wherein the communication sessions progress in a transactional manner, the system comprising:

a capture module operable to receive a transaction signature composed of a plurality of transaction elements, wherein the transaction signature is characteristic of a communication transaction;

a signature formation module operable to utilize transaction elements received by the capture module to create signatures associated with the communication transaction;

a memory operable to store at least one previously identified transaction signature pattern;

a signature recognition module operable to determine whether the received transaction signature corresponds to a previously identified transaction signature pattern; and a classification module operable to, if the received transaction signature does not correspond to a previously identified transaction signature pattern, create a new transaction signature pattern, and classify the new transaction signature pattern as one of a plurality of classifications indicative of completion or failure of the communication transaction, wherein the transaction signature is selected from a group consisting of a start line signature composed of a combination of start line words in SIP messages, a header signature composed of a combination of header messages; a parameter signature composed of one or more parameters, and a Session Description Protocol (SDP) parameter signature.

2. A system as recited in claim 1, wherein the classification module is further operable to classify the received transaction signature with the classification of a corresponding transaction signature pattern if the received transaction signature corresponds to a previously identified transaction signature pattern.

3. A system as recited in claim 1, wherein the classification module is further operable to classify the new transaction signature pattern automatically.

4. A system as recited in claim 1, wherein the classification module is further operable to classify the new transaction signature pattern manually.

5. A system as recited in claim 1, wherein the new transaction signature pattern is named.

6. A system as recited in claim 1, wherein the transaction signature is built.

7. A system as recited in claim 1, wherein the classification module is further operable to classify the transaction signature as good or bad.

8. A system for identifying successful and unsuccessful calls conducted over a packet network, the system comprising:
   a capture module operable to collect messages associated with a selected call;
   a signature formation module operable to form a signature out of the collected messages, wherein the signature is normalized against a parameter in at least one of the messages, so that the signature can be compared to known signature patterns with normalized parameters, wherein the known signature patterns each have an associated classification indicating a good call signature or a bad call signature, wherein the transaction signature is selected from a group consisting of a start line signature composed of a combination of start line words in SIP messages, a header signature composed of a combination of header messages, a header signature composed of a combination of header messages, a parameter signature composed of one or more parameters, and a Session Description Protocol (SDP) parameter signature;
   a memory operable to store at least one transaction signature pattern;
   a signature recognition module operable to search for a known signature pattern in memory that corresponds to the formed signature, wherein if a known signature pattern is found that corresponds to the formed signature, classifying the formed signature with the classification associated with the corresponding known signature pattern, and wherein if a known signature pattern is not found that corresponds to the formed signature, generating a new signature pattern based on the formed signature pattern and classifying the new signature pattern as either a good call signature or a bad call signature.

9. A system as recited in claim 8, wherein the signature formation module normalizes the parameter by substituting the parameter with a pattern.

10. A system as recited in claim 8 further comprising a classification module operable to dynamically update a dictionary of signature patterns as the signature patterns become known.

11. A system for use in performing interoperability testing between two network architectures, the system comprising:
   a signature formation module operable to form a plurality of transaction signatures, wherein each transaction signature is characteristic of a communication transaction conducted over the two networks;
   a memory operable to store at least one transaction signature;
   a signature recognition module operable to analyze each of the plurality of transaction signatures to determine if the transaction signature matches a previously classified pattern in memory; and
   a classification module operable to generate a report identifying each of the plurality of communication transactions and indicating that each of the plurality of communication transactions are classified with a classification associated with a previously classified pattern or are of unknown classification, wherein the transaction signature is selected from a group consisting of a start line signature composed of a combination of start line words in SIP messages, a header signature composed of a combination of header messages, a parameter signature composed of one or more parameters, and a Session Description Protocol (SDP) parameter signature.

12. A system as recited in claim 11 further comprising:
   the signature formation module further operable to identify transaction elements associated with the transaction;
   combine the transaction elements by performing one or more of:
      concatenating the transaction elements;
      execute an algorithm over the transaction elements;
      normalize a constituent part of a transaction element; and
      extract a selected part from a transaction element.

13. A system as recited in claim 11 further comprising:
   the classification module further operable to analyze each of the plurality of transaction signatures automatically by comparing each of the transaction signatures to a plurality of previously classified signature patterns.

* * * * *